United States Patent
David et al.

(10) Patent No.: US 10,981,615 B2
(45) Date of Patent: Apr. 20, 2021

(54) FUEL TANK ARRANGEMENT WITH AT LEAST TWO SEPARATE TANK BODIES

(71) Applicant: KTM AG, Mattighofen (AT)

(72) Inventors: Fritz David, Salzburg (AT); Herbert Fessl, Treubach (AT); Helmut Gröbner, Waging am See (DE); Alexander Reindl, Uttendorf (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 15/931,208

(22) Filed: May 13, 2020

(65) Prior Publication Data
US 2020/0361556 A1    Nov. 19, 2020

(30) Foreign Application Priority Data

May 15, 2019 (DE) ...................... 10 2019 112 741.6

(51) Int. Cl.
*B62J 35/00*          (2006.01)
*B60K 15/035*     (2006.01)
(Continued)

(52) U.S. Cl.
CPC ............. *B62J 35/00* (2013.01); *B60K 15/035* (2013.01); *B60K 15/0406* (2013.01);
(Continued)

(58) Field of Classification Search
CPC .... B62J 35/00; B60K 15/035; B60K 15/0406; B60K 2015/03131; B60K 2015/03144
See application file for complete search history.

(56) References Cited

U.S. PATENT DOCUMENTS 3,021,855 A * 2/1962 Cartwright ........... B60K 15/077
                                                              137/38
3,083,720 A * 4/1963 Cartwright ............. B65D 90/00
                                                              137/38
(Continued)

FOREIGN PATENT DOCUMENTS

DE          44 00 919 A1      7/1995
DE     698 27 782 T2      11/2005
(Continued)

OTHER PUBLICATIONS

KTM AG, "Bedienungsanleitung 2019," Operator's Manual for 1290 Super Adventure S, Aug. 2018, Germany.
(Continued)

*Primary Examiner* — Minnah L Seoh
*Assistant Examiner* — Michael R Stabley
(74) *Attorney, Agent, or Firm* — Rod D. Baker

(57) ABSTRACT

A fuel tank system is provided with at least two separate tank bodies, each with a respective tank body interior, and a connecting element connecting the tank bodies for fluid communication. The tank bodies are connected to each other by means of a connector and are fabricated from a plastic material. The fuel tank system is formed with receiving means (5) for arrangement on a frame of a vehicle, such as a motorcycle, having a driver's saddle. The fuel tank system includes a distributor element with a fuel filling opening; the distributor element is connected in a fluid-conducting manner to the tank bodies via at least one fluid-conducting connector.

14 Claims, 14 Drawing Sheets

(51) Int. Cl.
  *B60K 15/04* (2006.01)
  *B60K 15/03* (2006.01)
(52) U.S. Cl.
  CPC ............ *B60K 2015/03131* (2013.01); *B60K 2015/03144* (2013.01); *B60K 2015/03217* (2013.01); *B60K 2015/03243* (2013.01); *B60K 2015/03493* (2013.01)

(56) References Cited

U.S. PATENT DOCUMENTS

| | | | | | |
|---|---|---|---|---|---|
| 4,703,771 | A | * | 11/1987 | Mimura | ............... B60K 15/077 137/142 |
| 4,799,569 | A | * | 1/1989 | Hattori | ..................... B62J 35/00 180/219 |
| 4,951,699 | A | * | 8/1990 | Lipman | ................ B60K 15/077 137/142 |
| 5,078,169 | A | * | 1/1992 | Scheurenbrand | .... B60K 15/073 137/571 |
| 5,360,034 | A | * | 11/1994 | Der Manuelian | .... B60K 15/077 123/514 |
| 5,732,684 | A | * | 3/1998 | Thompson | ......... F02M 37/0052 123/509 |
| 6,283,142 | B1 | * | 9/2001 | Wheeler | ........... F02M 37/0094 123/509 |
| 6,557,595 | B2 | * | 5/2003 | Ozaki | .................. B60K 15/035 137/202 |
| 6,604,539 | B1 | * | 8/2003 | Strohmayer | ......... B60K 15/035 137/202 |
| 6,607,005 | B2 | * | 8/2003 | Viebahn | ............... B60K 15/077 123/510 |
| 6,792,966 | B2 | * | 9/2004 | Harvey | ............. F02M 37/0047 123/514 |
| 7,614,854 | B2 | * | 11/2009 | Palvolgyi | ............. B60K 15/077 141/126 |
| 7,748,746 | B2 | * | 7/2010 | Beiber Hoeve | ........ B62K 11/04 280/835 |
| 8,342,358 | B2 | * | 1/2013 | Kobayashi | ....... B60K 15/03177 220/563 |
| 8,353,322 | B2 | * | 1/2013 | Pozgainer | ............. B60K 15/04 141/303 |
| 8,622,074 | B2 | * | 1/2014 | Hochstein | ........ B60K 15/03519 137/202 |
| 8,881,854 | B2 | * | 11/2014 | Nishimura | ............. B60K 15/07 180/69.4 |
| 8,910,675 | B2 | * | 12/2014 | Coulon | ........... B60K 15/03519 141/198 |
| 9,126,648 | B2 | * | 9/2015 | Nishimura | ............... B62J 35/00 |
| 2001/0035215 | A1 | * | 11/2001 | Tipton | ................. B60K 15/077 137/571 |
| 2008/0169134 | A1 | | 7/2008 | Tomolillo et al. | |
| 2018/0162220 | A1 | * | 6/2018 | Kobayashi | ............. F02M 37/00 |

FOREIGN PATENT DOCUMENTS

| | | |
|---|---|---|
| DE | 10 2004 021 649 A1 | 12/2005 |
| DE | 10 2007 009113 B4 | 1/2018 |
| DE | 10 2017 119 706 A1 | 2/2019 |
| EP | 1 810 866 A2 | 7/2007 |
| EP | 2 165 921 B1 | 8/2015 |
| EP | 3 002 193 B1 | 4/2018 |
| JP | 04237688 A | 8/1992 |

OTHER PUBLICATIONS

KTM AG, "Bedienungsanleitung 2018," Operator's Manual for 1290 Super Duke R, Oct. 2017, Germany.

\* cited by examiner

US 10,981,615 B2

FUEL TANK ARRANGEMENT WITH AT LEAST TWO SEPARATE TANK BODIES

CROSS-REFERENCE TO RELATED APPLICATIONS

This application claims priority to German Patent Application No. DE 10 2019 112 741.6 filed 15 May 2019, the contents of which are incorporated herein by reference.

BACKGROUND OF THE INVENTION

Field of the Invention

The present invention relates to fuel tanks, particularly to a tank arrangement having at least two separate tank bodies each with a respective tank body interior and at least one connecting element connecting the tank bodies for fluid communication. The tank bodies and the fuel tank arrangement are formed with receiving means for arrangement on a frame component of a vehicle with a driver's saddle. The vehicle with a driver's saddle may be a motorcycle, for example, or a more than single-track vehicle in the form of a quad or ATV, for example.

Background Art

In known vehicles such as motorcycles, "quad bikes," ATVs and the like, the fuel tank arrangement is often designed as a saddle tank, which is positioned in front of the driver's saddle, viewed in the direction of travel of the vehicle, and spans a frame top in the form of, for example, a top draft tube.

For example, EP 2 165 921 B1 has made it known that a one-piece fuel tank made of a plastic material in the form of a saddle tank is covered by a multi-part cover which is connected to each other by connecting elements in the form of, for example, brackets, and the cover serves to cover the fuel tank. And on the basis of EP 3 002 193 B1, a fuel tank for a motorcycle has become known, which is manufactured by forming an aluminum sheet.

On the basis of DE 10 2007 009 113 B4, a multi-part fuel tank has become known which is designed as a saddle tank and is assembled as a welded construction from three parts, i.e., a tank top, a tank bottom and a tank front, which are accordingly joined together by welding.

On the basis of DE 698 27 782 T2 a multi-part tank for a motorcycle has become known, which consists of a fuel tank, an air filter box and an expansion tank for the coolant of the motorcycle's engine.

Based on DE 10 2004 021 649 A1, a known saddle tank for motorcycles is constructed in one piece and has a left tank volume and a right tank volume, and both tank volumes are connected to each other by means of a central tank area. Within the saddle tank thus formed, a connecting line is arranged which connects the two tank volumes, and a baffle plate inside the tank ensures that when the known tank is filled with fuel, the fuel initially flows primarily into one tank volume and when the fuel level inside the tank rises, air is displaced from the connecting line by the rising fuel level; when the motorcycle engine is operated, the fuel level in both tank volumes drops in the same way.

Finally, by the applicant, a fuel tank assembly with two separate tank bodies, each with a respective tank interior and a connecting element connecting the tank bodies for fluid communication, has become known. In the case of this known fuel tank assembly, the two shells are formed by means of a plastic material and the two shells can be fixed by means of attachment means to a frame component of the vehicle fitted with it, with a rider's saddle in the shape of a motorcycle. In this known fuel tank arrangement, both tank bodies have a respective fuel filler opening with a respective fuel filler cap, which can be operated by the driver of the vehicle by means of a key. The tank bodies, which are separate from each other, are fixed separately to the frame of the vehicle by means of screw connections when the vehicle is assembled.

Although this well-known configuration of a fuel tank arrangement has already proven itself in practice, there is still room for change to achieve better manageability when mounting the vehicle to be equipped with the fuel tank arrangement and also to simplify the fuel tank arrangement.

SUMMARY OF THE INVENTION

The present invention provides a fuel tank arrangement apparatus with at least two separate tank bodies, each body with a respective tank body interior, and at least one connecting element connecting the tank bodies for fluid communication, and with the tank bodies and the fuel tank arrangement being formed with receiving means for arrangement on a frame component of a vehicle with a driver's saddle. The fuel tank arrangement has a distributor element with a fuel filling opening, and the distributor element is connected to the tank bodies in a fluid-conducting manner by means of at least one fluid-conducting connecting means.

The fuel tank apparatus in accordance with the invention thus formed has, in addition to the separate tank bodies which are connected via at least one connecting element for fluid communication, a distributor element which is also connected to the tank bodies in a fluid-conducting manner. The distributor element has only one common fuel filling opening, via which both tank bodies can be filled with fuel when filling the fuel tank apparatus in accordance with the invention.

According to the invention, it is possible not only to save one fuel filler cap, but also to increase the comfort for the user of the vehicle, because the fuel filler cap, which is then only simply necessary, can also be designed as a fuel filler cap that can be locked by means of an electromagnetically operated locking element. Such a fuel filler cap requires additional components in the form of, for example, an electronic control device and the aforementioned locking element, and the omission of a fuel filler cap, on the one hand, provides for a corresponding savings potential with regard to the costs of the fuel tank arrangement and, on the other hand, a gain in comfort for the user, as the user is capable of refueling the fuel tank apparatus according to the invention by means of the operation of only one cap. After refueling, the cap can be locked in the closed state by means of the locking member, even without the operation by means of a key, whereby in addition to the gain in comfort due to the necessity of only one refueling operation, a gain in safety for the user of the vehicle is also achieved. Advantageous embodiments of these features are described in the further claims.

BRIEF DESCRIPTION OF THE SEVERAL VIEWS OF THE DRAWING

The invention is explained in more detail below on the basis of the drawing. This shows in.

DETAILED DESCRIPTION OF THE INVENTION

Figure 1:
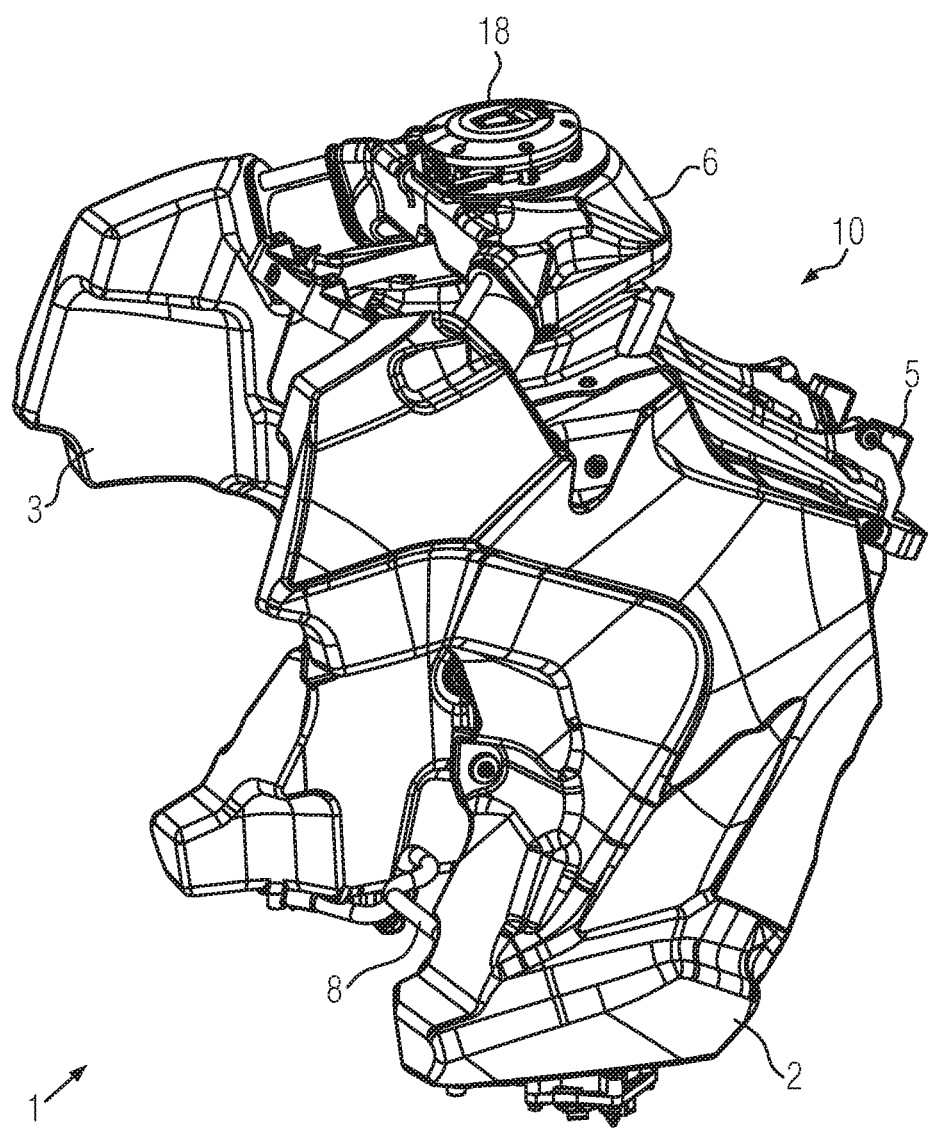
FIG. 1 is a perspective general view of an embodiment of the fuel tank arrangement according to the present invention.

There is provided by the present invention a fuel tank system and apparatus with at least two separate tank bodies. Each tank body has a respective tank body interior. At least one connecting element connects the tank bodies for fluid communication, with the tank bodies and the fuel tank system being configured with receiving device or means for arrangement on a frame component of a vehicle with a driver's saddle. The fuel tank system has a distributor element with a fuel filling opening, and the distributor element is connected to the tank bodies in a fluid-conducting manner by means of at least one fluid-conducting connecting means.

The fuel tank apparatus in accordance with the invention thus formed has, in addition to the separate tank bodies which are connected via at least one connecting element for fluid communication, a distributor element which is also connected to the tank bodies in a fluid-conducting manner. The distributor element has only one common fuel filling opening, via which both tank bodies can be filled with fuel when filling the fuel tank apparatus.

According to the invention, it is possible not only to save one fuel filler cap—two caps are not needed—but also to increase the comfort for the user of the vehicle. Comfort is enhanced because the fuel filler cap, which is then only one simply necessary, can also be designed as a fuel filler cap that can be locked by means of an electromagnetically operated locking element. Such a fuel filler cap requires additional components in the form of, for example, an electronic control device and the aforementioned locking element, and the omission of a fuel filler cap provides for a corresponding savings potential with regard to the costs of the fuel tank arrangement. There also is a gain in comfort for the user, as the user is capable of refueling the fuel tank apparatus according to the invention by means of the operation of only one cap. After refueling, the cap can be locked in the closed state by means of the locking member, even without the operation by means of a key, whereby in addition to the gain in comfort due to the necessity of only one refueling operation, a gain in safety for the user of the vehicle is also achieved.

The tank bodies may be made of a plastic material, but may also be made of a metallic material, for example, of a sheet metal material, or have a configuration based on a composite construction.

According to a further aspect of the fuel tank arrangement apparatus, it is intended that the distributor element is designed in such a way that the tank bodies can be filled with fuel by means of only one fuel filling opening of the distributor element. For this purpose, the distributor element may have a distributor body with a distributor body interior, from which the at least one fluid-conducting connecting means to the tank bodies is provided, for filling the tank bodies with fuel. According to this configuration, it is therefore possible that a fluid-conducting connecting means extends from the interior of the distributor body to a tank body, from which a fluid-conducting connecting means extends to the second tank body, or also a configuration according to which a fluid-conducting connecting means extends from the interior of the distributor body to each of the physically separate tank bodies; and in both cases the separate tank bodies can thus be filled by filling the interior of the distributor body with fuel via the only one single fuel filling opening.

It is provided according to a further aspect of the invention that the fuel tank arrangement has a first fluid-conducting venting device or venting means situated between a respective tank body and the distributor element, and a second fluid-conducting venting device situated between a respective tank body and the distributor element.

In the case of a one-piece saddle tank, when the tank is filled with fuel, the ventilation of the saddle tank takes place via the open fuel filler opening through which the fuel is filled into the tank interior and, during operation of the vehicle with the fuel filler cap closed, via the fuel filler cap itself, since the fuel in the tank interior can expand due to heat acting on the fuel during operation and, to do this, a corresponding volume of air in the tank interior must be displaced. In contrast, in the present invention two separate venting devices are beneficially provided for each tank body for venting the fuel tank arrangement. The first fluid-conducting venting device is intended for venting during the refueling process. This first fluid-conducting venting device can be formed by a hose line, or another fluid connection, between the interior of the tank body and the interior of the distributor body, so that when the fuel level in the interior of the tank body slowly rises during the filling process and fuel flowing through the fluid-conducting connection means is displaced by the rising fuel level, air displaced by the rising fuel level can flow out of the interior of the tank via the first fluid-conducting venting device.

If the fuel level then reaches the outlet end of the first fluid-conducting venting device in the interior of the tank body, no more air can escape from the interior of the tank through the first fluid-conducting venting device, in the direction of the distributor body interior, if the fuel level continues to rise. This causes the distributor body interior to fill with fuel, and the fuel level in the distributor body interior to rise towards the fuel filler opening. After completion of the refueling process, fuel is thus located in the interior of the distributor body, which then, however, slowly descends from the interior of the distributor body towards the interior of the tank body via the second fluid-conducting venting device. The second fluid-conducting venting device, situated between the distributor element and the tank body, acts in the manner of a throttle; in return an empty space is released in the interior of the distributor body, which is available as an expansion tank for itself during operation of a vehicle equipped with the present fuel tank arrangement.

The user of the vehicle can therefore perform the refueling operation in the way known to the user, by inserting the fuel supply nozzle through the fuel filler opening into the distributor body and continuing the refueling process until the automatic shut-off function of the nozzle stops the flow of fuel (or until a visual check of the fuel level in the distributor body indicates to the user that the refueling process is complete).

A fuel then located in the interior of the distributor body flows via the second fluid-conducting venting device between the respective tank body and the distributor element into the respective tank body, which results in the above-described compensating volume being provided in the interior of the distributor body.

It is provided in this case according to a further aspect of the invention that the respective first and second venting devices extend from the interior of the tank body of a respective tank body to the interior of the distributor body, and at least one venting device is arranged at least along a partial region of the extension from the interior of the tank body to the interior of the distributor body within the fluid-conducting connecting means. In this way it is achieved that the fluid-conducting connecting means is arranged in the form of, for example, a connecting hose between the interior of the distributor body and the interior of the tank body within the connecting hose. A space-saving and easy-to-install configuration is thus provided.

It is also provided that the aforementioned second venting device has a throttle in the area of the fluid-conducting connection to the interior of the distributor body, or the interior of the tank body, which is represented by a reduction in the diameter of the inner diameter of a fluid-conducting connecting line of the second venting device. By means of this throttle, the slow flow-off of the fuel volume located in the interior of the distributor body after the refueling process is achieved, and the escape of fuel due to the rising of air bubbles from the interior of the tank body during the post-flow process is prevented.

An advantage of the fuel tank arrangement according to the invention is, for example, that the individual body elements of the fuel tank arrangement with volume interiors, although they can be integrated into a single assembly, as will be explained below, can be manufactured by means of a cost-effective blow molding process.

The invention is thus characterized according to a further aspect of the apparatus in that the tank bodies and the distributor element are each manufactured from a plastic material by means of a blow molding process; each has a connecting piece at mutually associated connection areas, which is manufactured from a plastic material by means of an injection molding process and is positively fixed to the respective connection area. This also leads to the advantage that the connecting areas, and/or connecting surfaces, can be formed with volume interiors during the manufacture of the respective body elements, while connecting elements with higher sealing requirements can be manufactured separately from the body elements and then, for example, can be connected to the body elements in a fluid-tight manner by means of a welding process.

According to another aspect of the invention, the fluid-conducting connecting means is a tubular body which can be detachably fixed between the tank body and the distributor body, and has an inner diameter which is dimensioned to accommodate a fluid-conducting venting device. This allows a space-saving configuration to be created after such a "pipe-in-pipe system," which also reduces the risk of damage to the venting device by reducing externally mounted, i.e. exposed, components.

It is also intended that the distributor body should have a connecting surface for the detachable fixing of a receptacle for fixing a tank cap of the vehicle. This connecting surface can therefore be formed in an advantageous manner during the manufacture of the distributor body, so that it is prepared for fixing the receptacle for the tank cap. The receptacle may, for example, be a tank cap base which is fixed to the receptacle by means of screw connections.

It is also provided that the aforementioned receiving means is configured in the form of a receiving device which is provided with a first receiving surface for releasably fixing the distributor element to the receiving device, and second receiving surfaces for releasably fixing the tank bodies to the receiving device, and mounting surfaces for releasably fixing the fuel tank assembly to the frame component of the vehicle. The receiving device is therefore a support module to which both the distributor element and the tank bodies can be detachably fixed in a state still separate from the frame component of the vehicle, for example by means of bolted connections; the unit thus pre-assembled can then be detachably fixed to the frame component of the vehicle as a fuel tank assembly. This configuration has the advantage that the fuel tank assembly can be pre-assembled separately, and can be subjected to any tests as a complete tank system, and can be separated from the vehicle as a complete tank system for any service work on the vehicle, thus reducing the risk of leakage when the tank is removed. In addition, the mounting surfaces device also has the advantage of providing additional attachment points for mounting other parts on the vehicle, such as fairings, storage compartments, or mounting parts for fixing the driver's saddle and the like.

The receiving means is formed by means of a plastic material and, in a plan view, has a substantially rectangular configuration with fixing lugs extending away from an underside surface for releasably fixing the tank bodies. The receiving means may also be provided with handle surfaces or handle recesses on the respective transverse sides, which are advantageous for mounting and dismounting the fuel tank assembly on and from the frame component, as creating handling areas of the fuel tank assembly.

According to another aspect of the invention, a tank body has a receiving surface on an underside region for the detachable fixing of a fuel pump, and a tank body has a receiving surface on an underside region for the detachable fixing of a level measuring device. The mounting surfaces may be flanged surfaces to which the fuel pump or the level measuring device can be detachably fixed, for example by means of screw connections. Or, they may also be mounting surfaces in the form of screwed or threaded sockets to which the fuel pump or the level measuring device can be fixed by means of sealing devices, for example by means of a union nut, so that in the event of repair of the said components, they can be easily dismantled and reassembled.

It is also provided, according to a further aspect of the invention, that the tank bodies are have receiving surfaces for supporting the tank bodies on elastic receiving means which can be detachably fixed to the frame component. These tank body receiving surfaces can be, for example, centering surfaces or sliding seats into which the elastic receiving means for supporting the tank bodies can be simply inserted; the tank bodies are in this way additionally fixed to the frame component after the receiving means have been fixed in the form of, for example, spacers.

According to another aspect of the invention, the connecting element mentioned previously is a connecting pipe which can be detachably fixed to the tank body in the area of its respective underside. For the fluid-tight and detachable fixing of the connecting line to the tank body, quick-release couplings can be provided, for example, which automatically seal when the connecting line is dismantled, and can automatically make a fluid-conducting connection when the connecting line is installed. These quick-connect couplings or nozzles to accommodate the quick-connect couplings may be situated at the lowest point of the shell in the vertical axis direction of the vehicle ready for use.

Finally, according to another aspect of the invention, the distributor element should have a compensating chamber designed to receive fuel, which can, for example, absorb the fuel during operation of the vehicle and expanding fuel.

Figure 17:
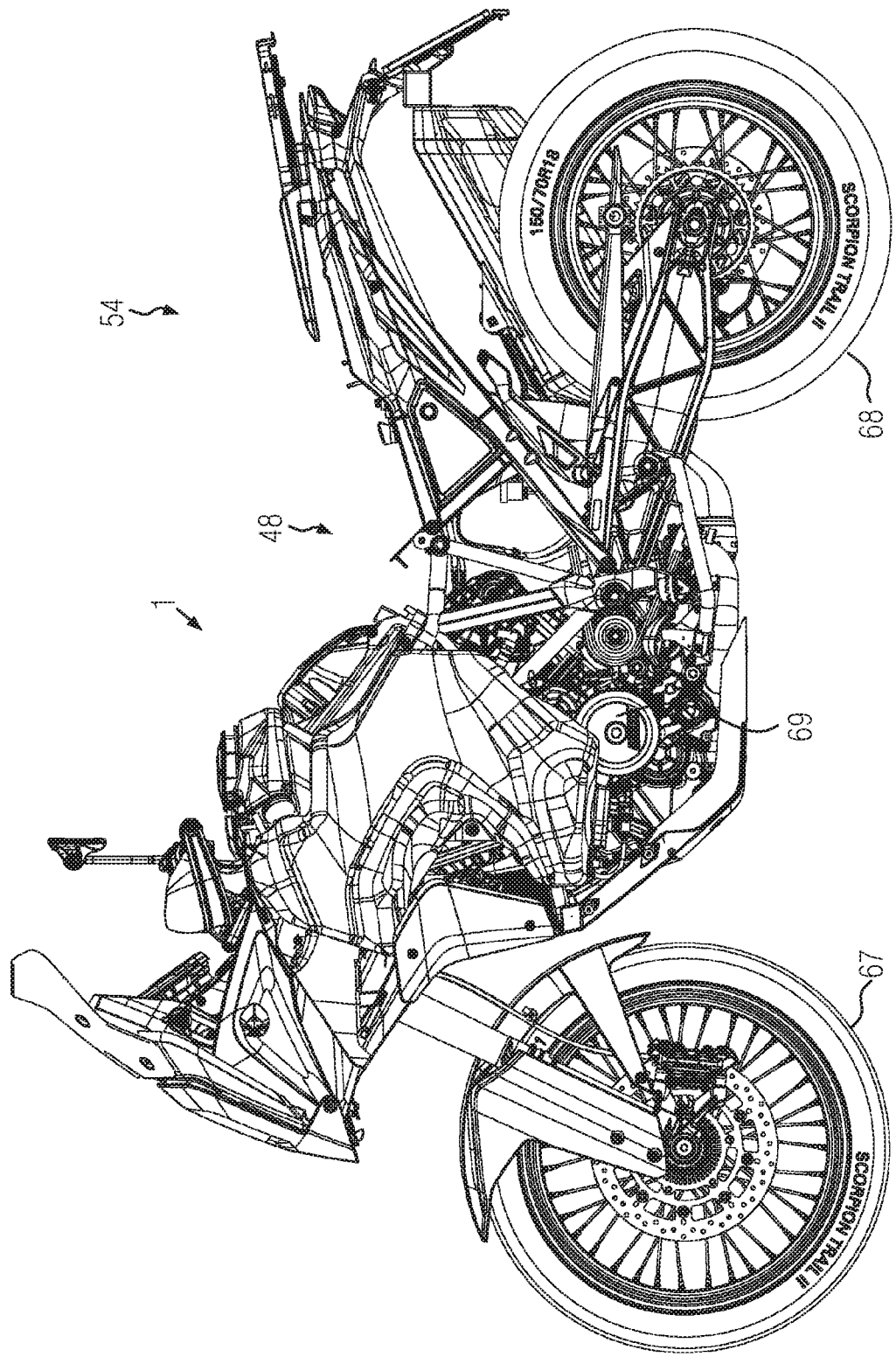
FIG. 17 is a side view of a motorcycle, with the present fuel tank arrangement mounted on the frame of the motorcycle.

Attention is invited to FIG. 1, which shows a perspective view of an embodiment of the fuel tank apparatus arrangement 1 according to the present invention in an overall view. The fuel tank assembly 1 has a first tank body 2, or a left tank body when viewed in the direction of travel of the motorcycle (as shown in FIG. 17), and a second or right tank body 3, which preferably are made of a plastic material in the design or embodiment shown. In addition, the fuel tank assembly 1 has a receiving means 4 in the form of a carrier module 5 further illustrated in FIG. 5 of the drawing, and a distributor element 6 in the form of a distributor body 7 (further illustrated in FIG. 3 of the drawing). In addition, the fuel tank assembly 1 in the area of the underside of the tank bodies 2, 3 has a connecting element 8 in the form of a connecting hose 9, which can be seen more closely in FIG. 6 of the drawing. There may also be two or more than two connecting elements 8 between the tank bodies.

Figure 2:
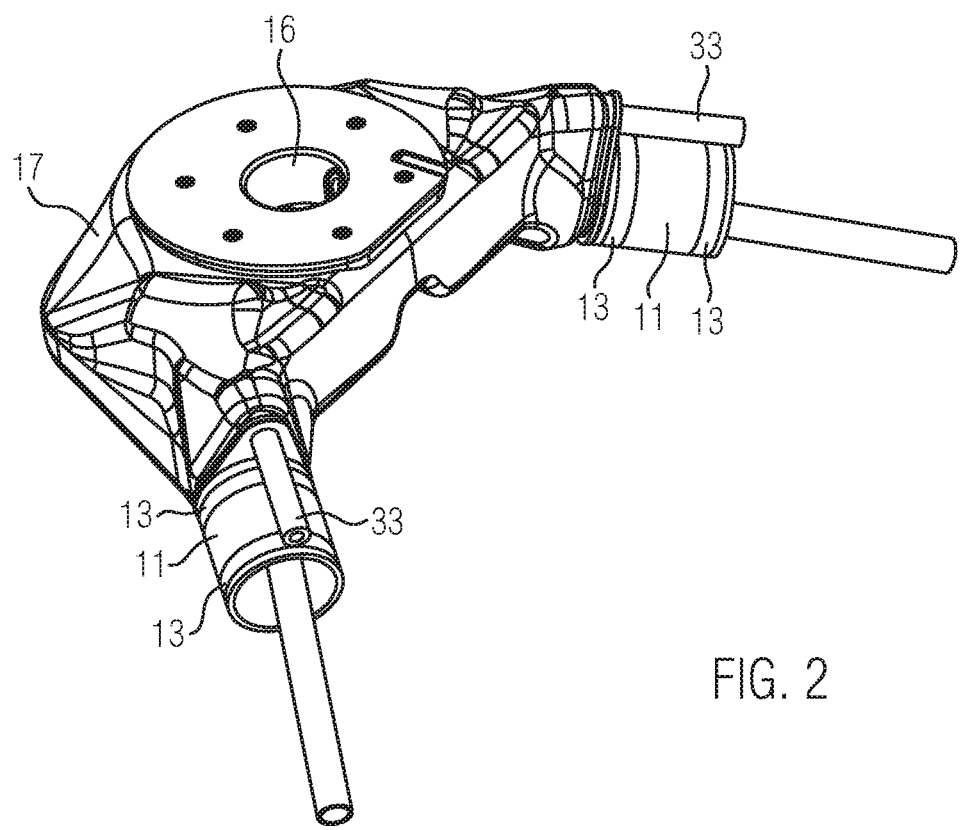
FIG. 2 is a perspective view of the distributor body according to the present invention.
Figure 4:
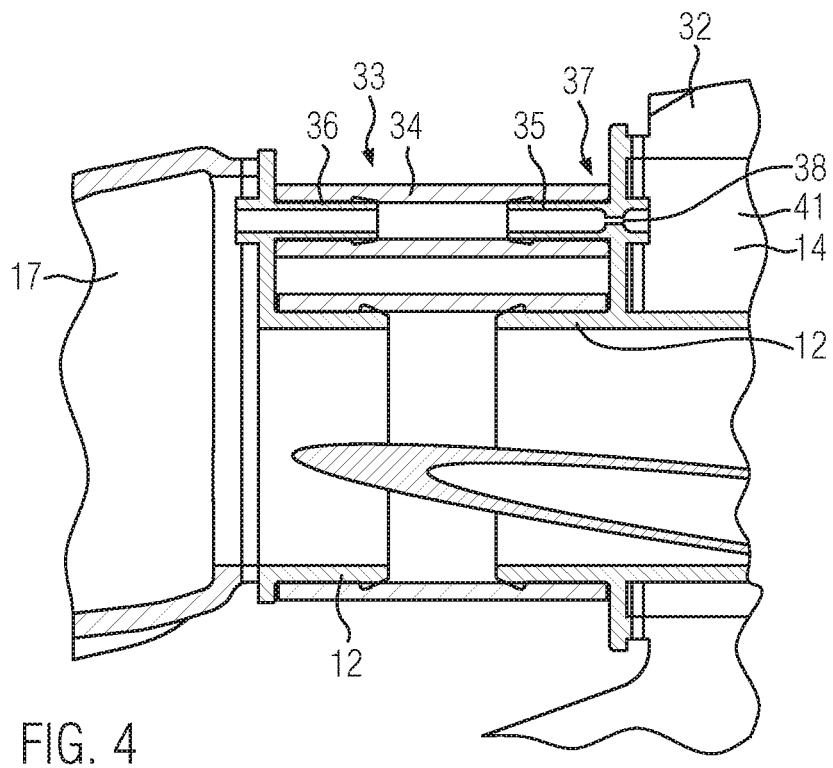
FIG. 4 a sectional view of an area between the distributor body and a tank body.
Figure 6:
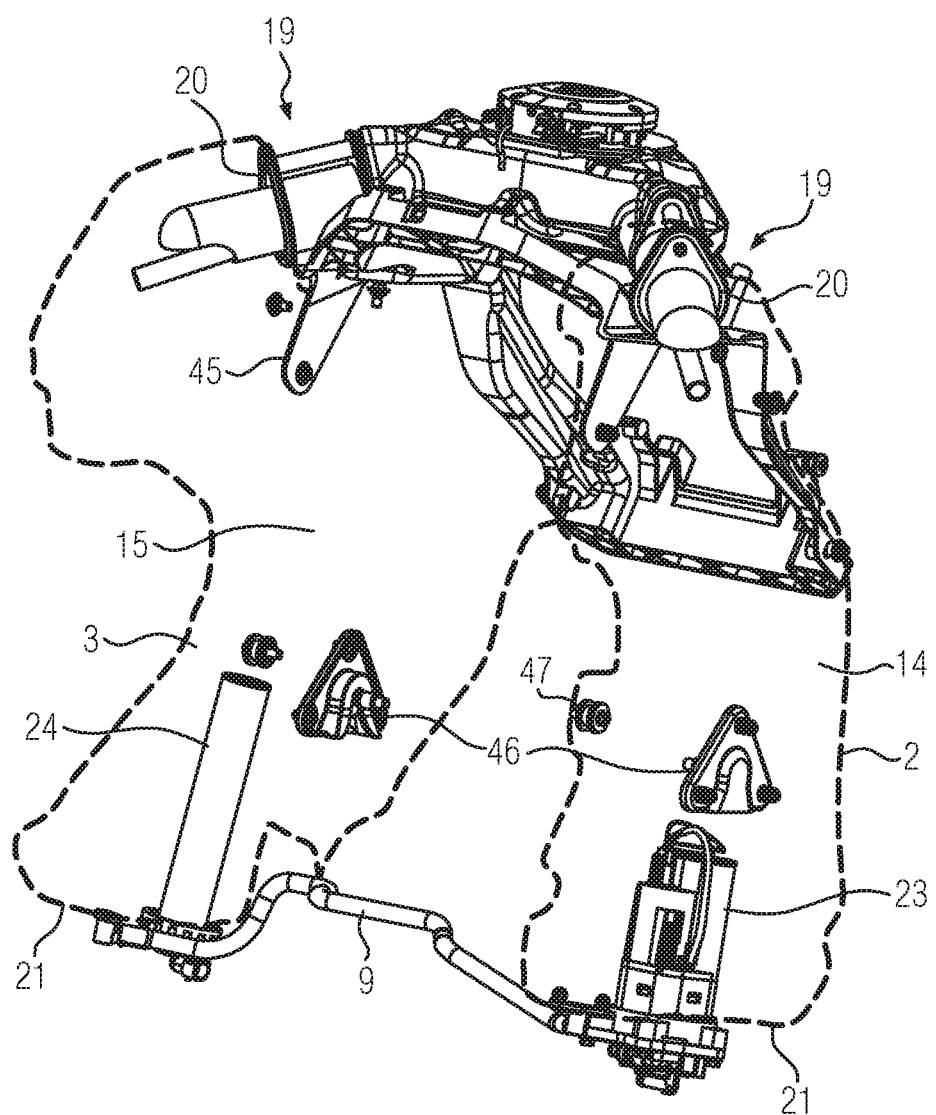
FIG. 6 a perspective view of the fuel tank arrangement, which view also shows the fuel pump and the level measuring device.

Additionally, a respective fluid-conducting connecting means 10 is provided between the distributor element 6 and the respective tank body 2, 3, which can be seen in FIG. 6 (on the basis of dashed outline edges), in the form of a fluororubber hose 11 which is shown in more detail in FIG. 2. The hose 11 is fluid-tightly connected on both sides via a respective connecting piece 12, as seen in FIG. 4, the respective fluororubber hose 11 being detachably fixed to the respective connecting piece 12 via a fastening means in the form of a clamp 13. The clamps 13 shown in FIG. 2 may be so-called ear clamps, which ensure a fluid-tight connection between the respective connecting piece 12 and the hose 11.

Each of the tank bodies 2, 3 has a respective tank body interior 14, 15 as shown in FIG. 6. On the upper side of the distributor element 6 there is a fuel filler opening 16, which is closer seen in FIG. 2, through which the fuel can be filled into the distributor body interior 17 (FIG. 13) when refueling the fuel tank assembly 1, from where the fuel can flow via the hoses 11 into the tank body interiors 14, 15. Furthermore, as shown in FIG. 1, a fuel filler cap 18 can be fitted to the fuel filler opening 16 of the distributor element 6, which can be a key operated fuel filler cap, or a fuel filler cap which is electromagnetically operated by means of a locking element.

The configuration of distributor element 6 or distributor body 7 ensures that tank bodies 2, 3 can be refueled by means of only one single fuel filler opening 16 on distributor element 6 or distributor element 7.

The two tank bodies 2, 3 can be manufactured by means of a cost-effective blow-molding process, and the distributor body 7 can also be manufactured by means of a cost-effective blow molding process.

Figure 3:
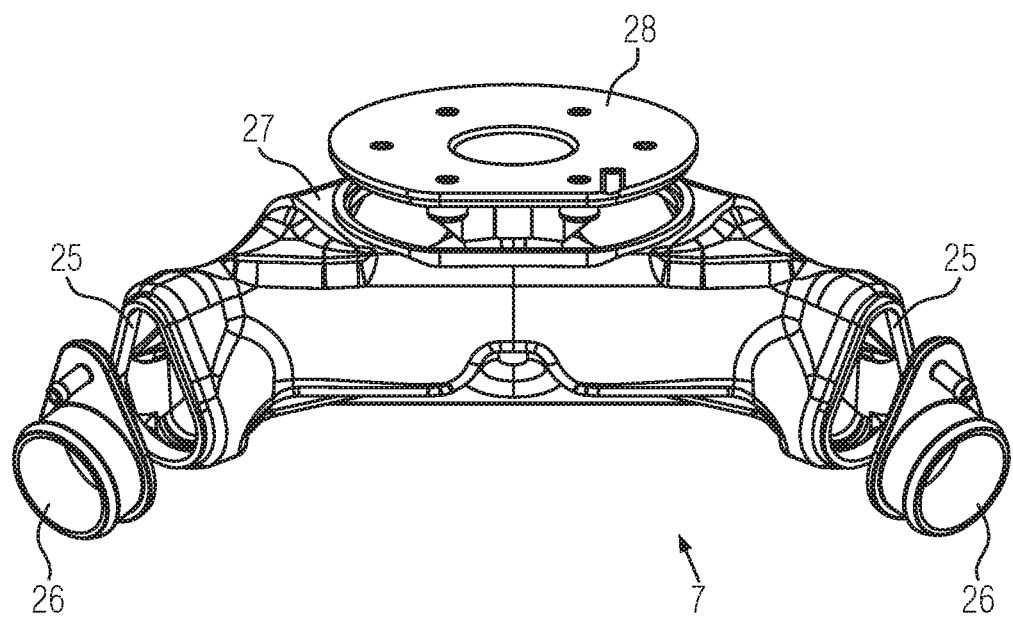
FIG. 3 is a perspective front view of the distributor body, with connection socket.

As can be seen from FIG. 3, the distributor body 7 has a largely triangular configuration in a plan view with outlets or connection areas 25, to each of which a connection piece 26 can be attached fluid-tight by means of a welding process, for example, infrared welding. The connection pieces 26 can also be injection molded and welded to the distributor body 7 in the area of the outlets 25. On the upper side 27 of the distributor body 7 there is a connecting flange 28 arranged, which can also be made of a plastic material, and that can be fixed as an injection-molded part to the blow molding distributor body 7 by means of a welding process.

As can be seen from FIG. 1 of the drawing, the two tank bodies 2, 3 have a configuration similar to an upside down letter "L" in a side view, with an opening 20 on the upper side 19, through which fuel guided by hoses 11 can flow into the tank interiors 14, 15. As can also be seen from FIGS. 6 and 7, both tank bodies 2, 3 have a receiving surface 22 on the respective underside, on which a fuel pump 23 (FIG. 6) and a level measuring device 24 can be detachably fixed.

Figure 12:
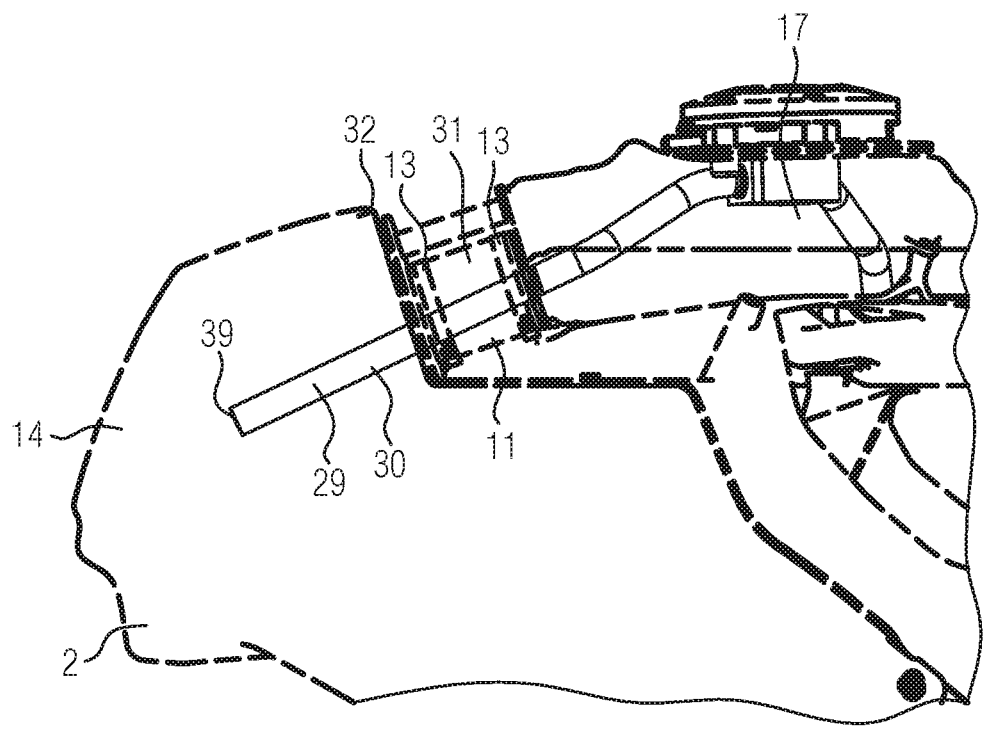
FIG. 12 is a sectional view of the fuel tank arrangement, illustrating the venting devices.

FIG. 12 shows that a first venting device 29 in the form of a venting hose 30 extends into the interior of the tank 14 of tank body 2, through the interior 31 of hose 11 and into the interior 17 of distributor body 7. The other tank body 3 also has such a first venting device 29 and is thus fluidically connected to the interior of the manifold body 17 of manifold body 7. The tank bodies 2, 3 have at the respective connection area 32 connection nozzles 12, which can be fixed there, fluid-tight, by means of a welding process.

Figure 13:
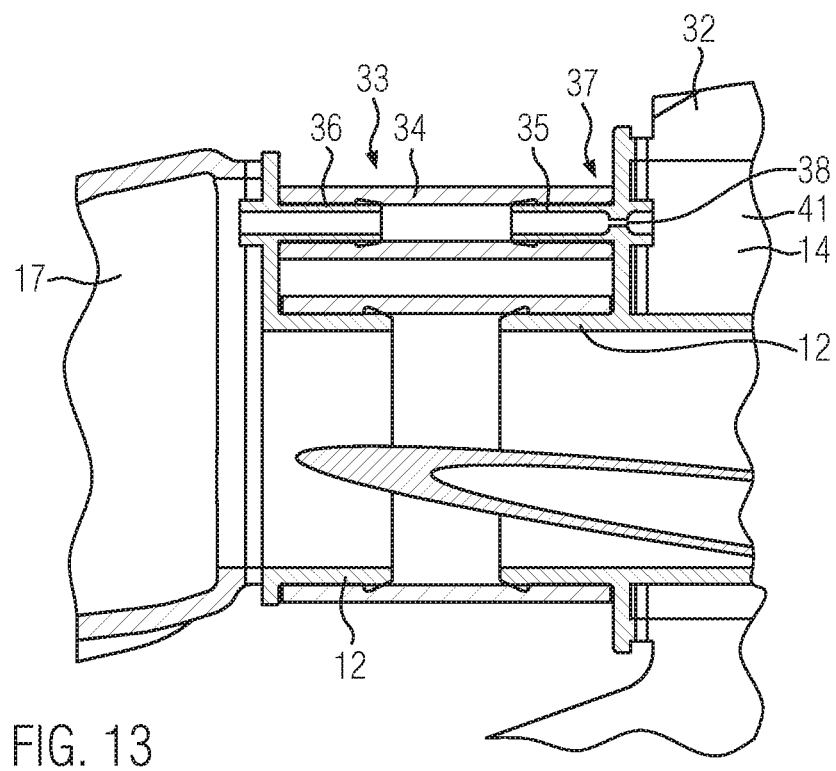
FIG. 13 an enlarged sectional view of the fuel tank arrangement, according to FIG. 12.

As can be seen most easily from FIG. 4, a second venting device 33 is provided between the distributor body interior 17 and the tank body interior 14, 15 in addition to the first venting device 29. This second venting device, which can also be seen in FIG. 2, can be provided in the form of a venting hose 34, which can be attached to the connection nozzle 12 of the distributor body 7 and tank body 2, 3 via hose connection pieces 35, 36. The second venting device 33 has a throttle 37, which is designed in the form of a diameter reduction 38 (as shown in FIG. 13), and ends in the area of the distributor body interior 17 or the distributor body at the highest point of the system in the vertical axis direction.

Figure 16:
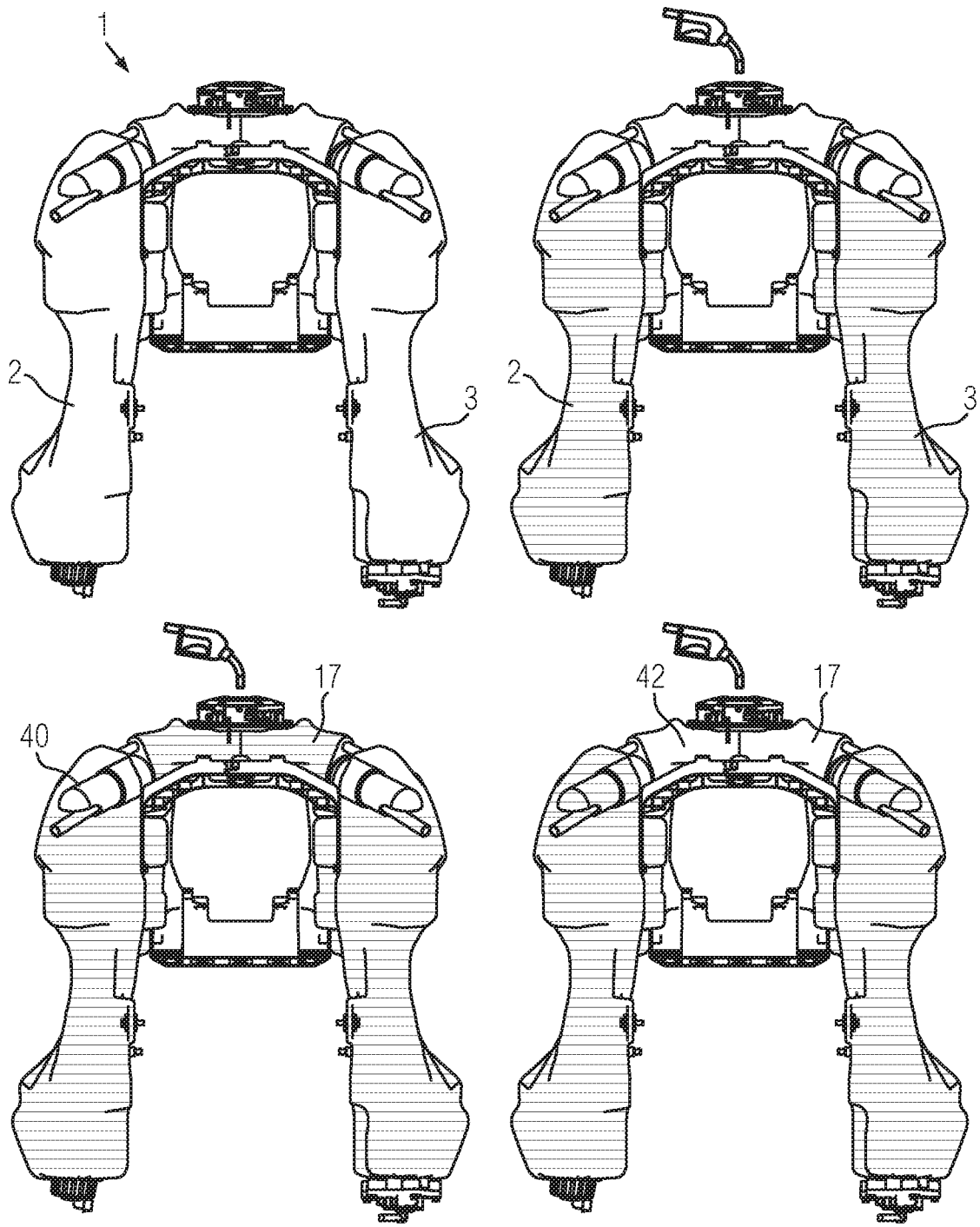
FIG. 16 provides four sequential illustrations, collectively explaining the venting of the fuel tank arrangement during the refueling process.

Reference is made to the illustrations of FIG. 16, depicting the refueling procedure as explained below. The upper left illustration in FIG. 16 shows the fuel tank arrangement 1 in an empty state without fuel. The upper right-hand illustration shows the fuel level after filling the tank bodies 2, 3 and, as the fuel level has reached the outlet end 39 of the venting hose 30 (shown in FIG. 12 of the drawing), no more air can escape through the first venting device 29 in the direction of the distributor body interior 17 from reaching this filling level. Further topping up with fuel will cause the distributor body interior 17 to fill with fuel, as shown in the lower left-hand illustration in FIG. 16 of the drawing.

A rise in the fuel level causes the schematically illustrated fuel pump or supply nozzle to switch off automatically, or the user interrupts the refueling process at the nozzle on his own initiative. Since, after completion of the refueling process, no air can escape through the first venting device 29, but air above fuel level 40 is still present in the interior of the tank 14 and 15, and this residual space 41 (as shown in FIG. 4) is in fluid communication with the second venting device 33, the air trapped in the residual space 41 can be slowly exchanged for the fuel in the interior of the distributor body 17 by slowly flowing into the residual space 41 via the throttle 37. This results in the fuel level shown in the lower right-hand illustration in FIG. 16; in the interior of the distributor body 17 there is a compensating chamber available to accommodate fuel expanding in tank bodies 2 and 3 and the second venting device 33 thus acts again as a vent.

Figure 5:
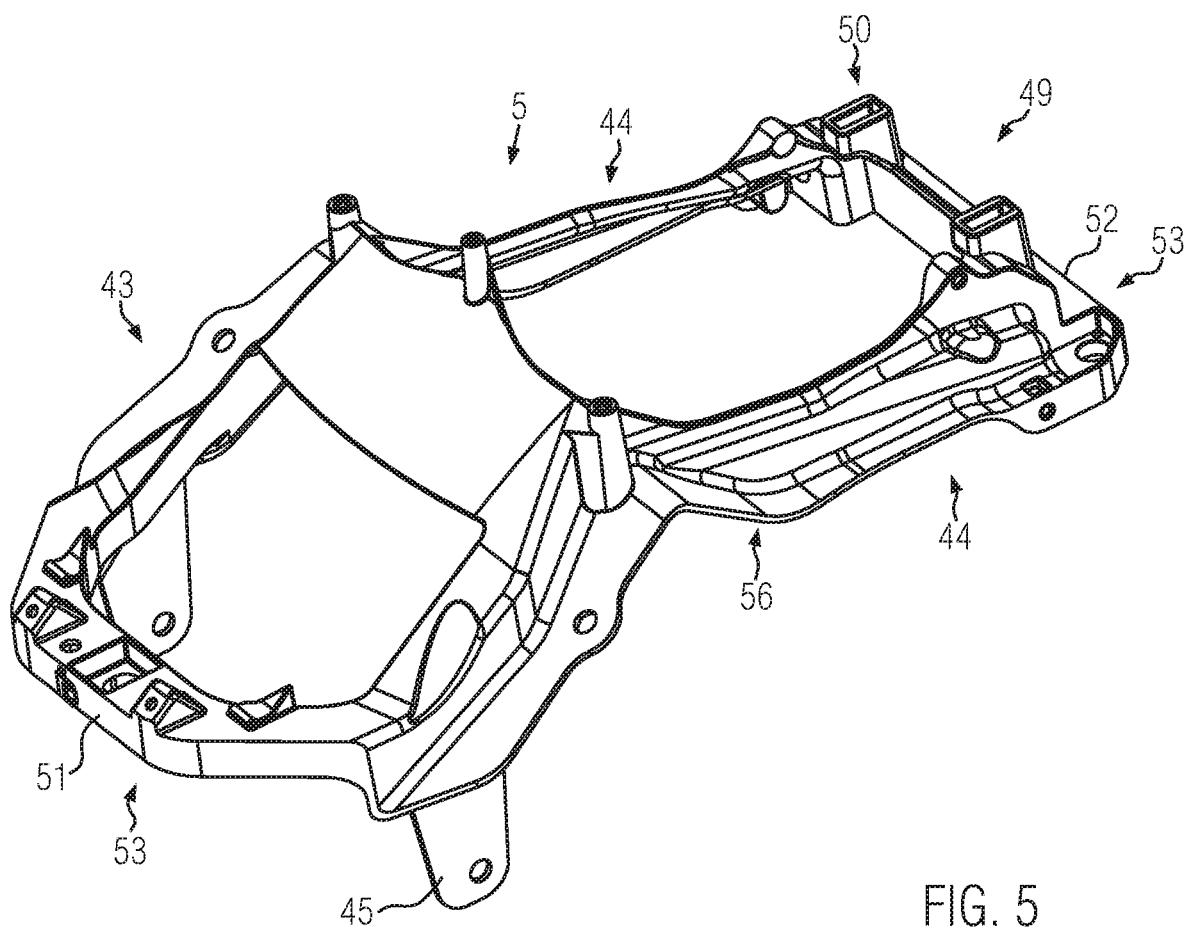
FIG. 5 a perspective view of a receiving device according to the invention, in the form of a carrier module to which both the tank body and the distributor body can be detachably fixed.

FIG. 5 shows in a perspective view the above mentioned carrier module 5, on which the tank bodies 2, 3 and the distributor body 7 can be detachably fixed, resulting in the configuration of the fuel tank assembly 1 shown in FIG. 1. The carrier module 5 has a first mounting surface 43, to which the distributor element 6 can be detachably fixed, for example by means of screw connections not shown in detail. In addition, the carrier module 5 has second mounting surfaces 44, to which the tank body 2, 3 can be detachably fixed, also by means of screw connections or the like. Further, carrier module 5 is provided with two fixing straps 45 extending downwards from the underside of carrier module 5 at a right angle to a large extent, to which the tank bodies 2, 3 can be detachably fixed, as can be seen, for example, from FIG. 6.

Figure 8A:
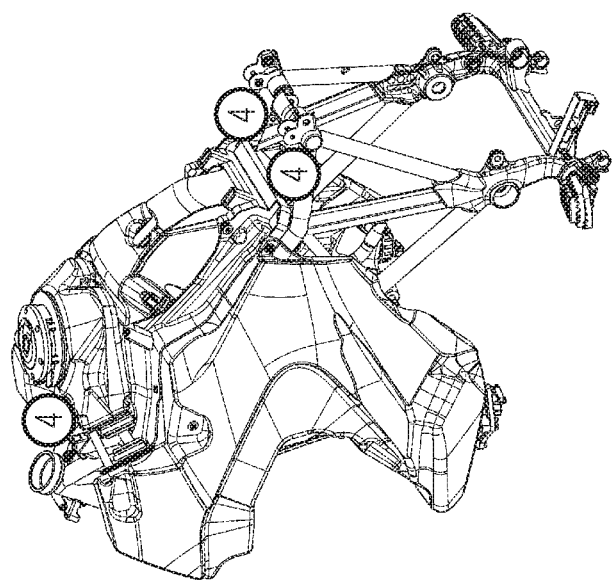
FIGS. 8A and 8B are two illustrations showing the arrangement of the fuel tank assembly on a frame component of a motorcycle.
Figure 8B:
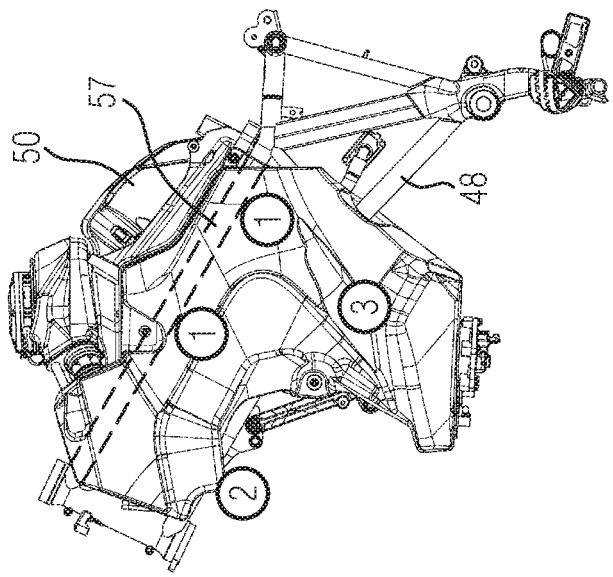
Figure 10:
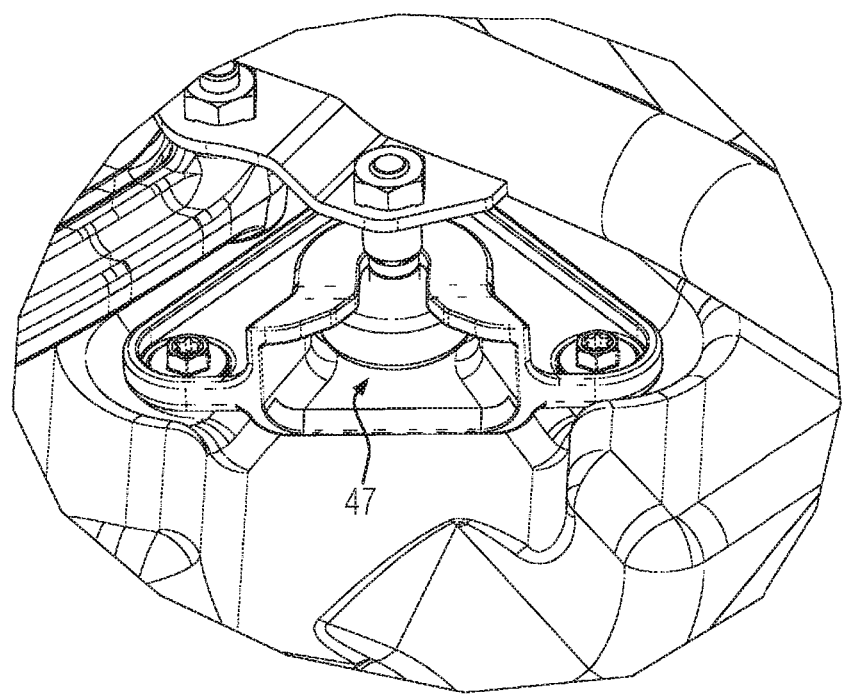
FIG. 10 is a side view of the frame component with a tank body fixed to it by elastic holding means.

Moreover, the two tank bodies 2, 3 on the respective inner side of the tank body 2, 3 have locating surfaces 46 for supporting the tank bodies 2, 3 on elastic locating means 47, as can be seen from FIGS. 6 and 10. The elastic receptacles 47 can be detachably fixed to the frame or frame component 48, which can be seen for example in FIGS. 8A and 8B, and thus serve for the additional support of the tank bodies 2, 3 on the frame 48. As can also be seen from FIG. 5, the carrier module 5 has a third mounting surface 50 on the upper side on which an air filter box 50 can be fixed. FIGS. 8A and 8B also are referenced in this regard.

The carrier module 5 preferably has handle elements 51, 52 on the respective transverse sides 53, by means of which, for example, when mounting the motorcycle 54 shown in FIG. 17, the fuel tank arrangement 1 can be placed on the frame 48. The fuel arrangement apparatus 1 according to the invention thus has the advantage of easy handling when mounting the motorcycle.

Figure 9A:
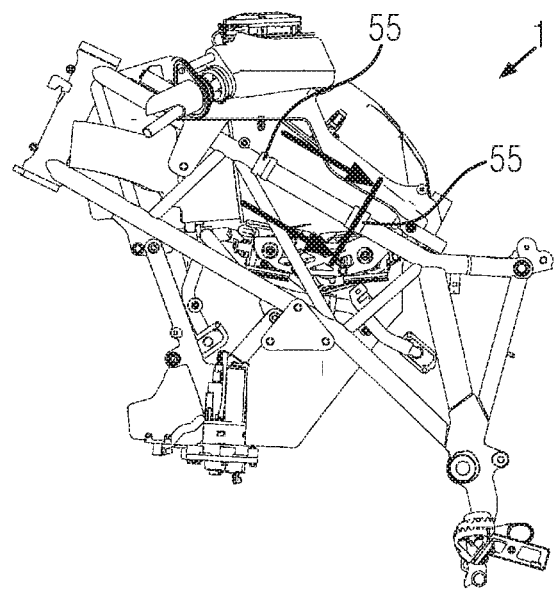
FIG. 9A is a diagram of a frame component.
Figure 9B:
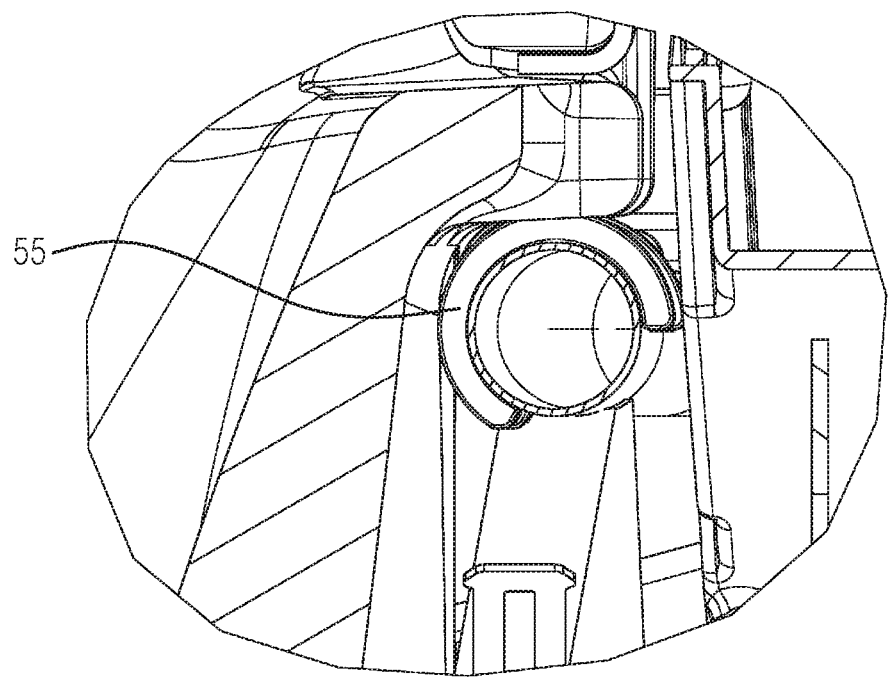
FIG. 9B is an enlarged view, taken in the direction of the directional arrows of FIG. 9A, with FIGS. 9A and 9B showing the main points of support on the frame component for the arrangement of the fuel tank assembly.

For mounting and securing the fuel tank assembly 1 to the frame 48, the frame has main support points 55, as shown in FIGS. 9A and 9B, where the fuel tank assembly 1 can be placed, depicted in FIGS. 8A and 8B. For this purpose, the fuel tank assembly 1 is arranged on the frame 48 in such a way that mounting surfaces 56 (see FIG. 5) on the respective top draft tube 57 come into contact with the main support points, as shown in FIGS. 8A and 8B, with the number 1 in a circle; the fuel tank assembly can be fixed to the frame 48 via lateral screw points (number 2 in a circle), and a sliding seat (number 3 in a circle), and screw points (number 4 in a circle).

Figure 11:
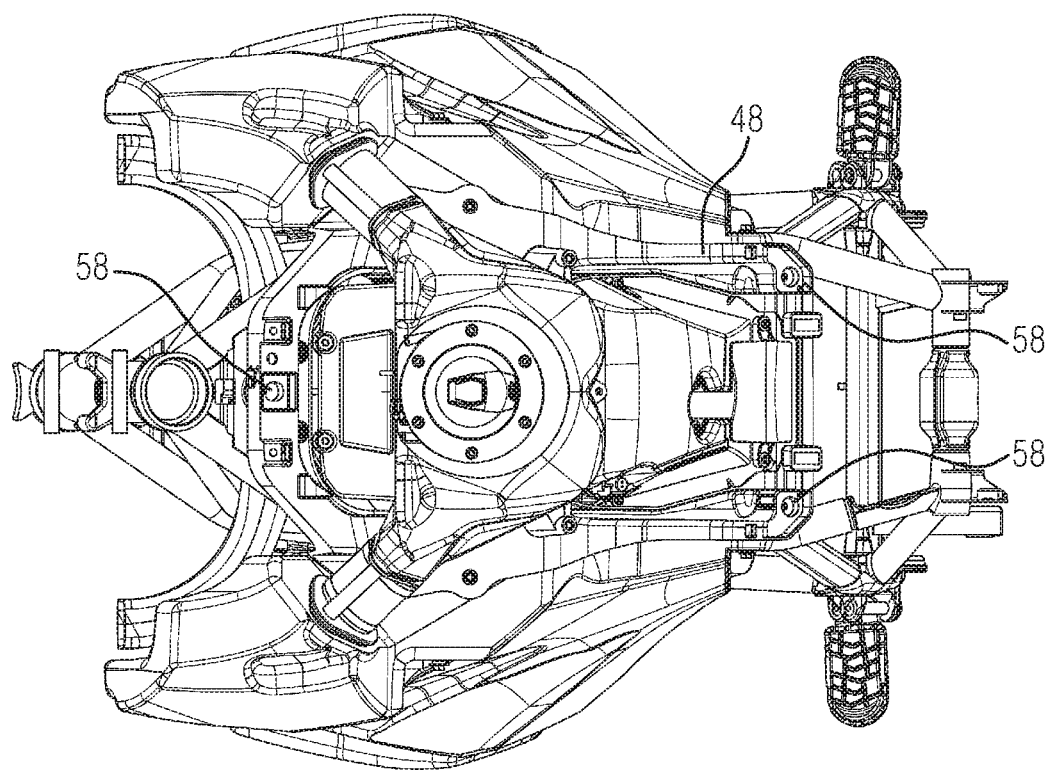
FIG. 11 a view from above of a section of the frame component with the fuel tank arrangement mounted on it.

FIG. 11 shows in a top view of the fuel assembly 1 how it can be fixed to the frame via the carrier module 5 with three attachment points 58 on the frame.

Figure 14:
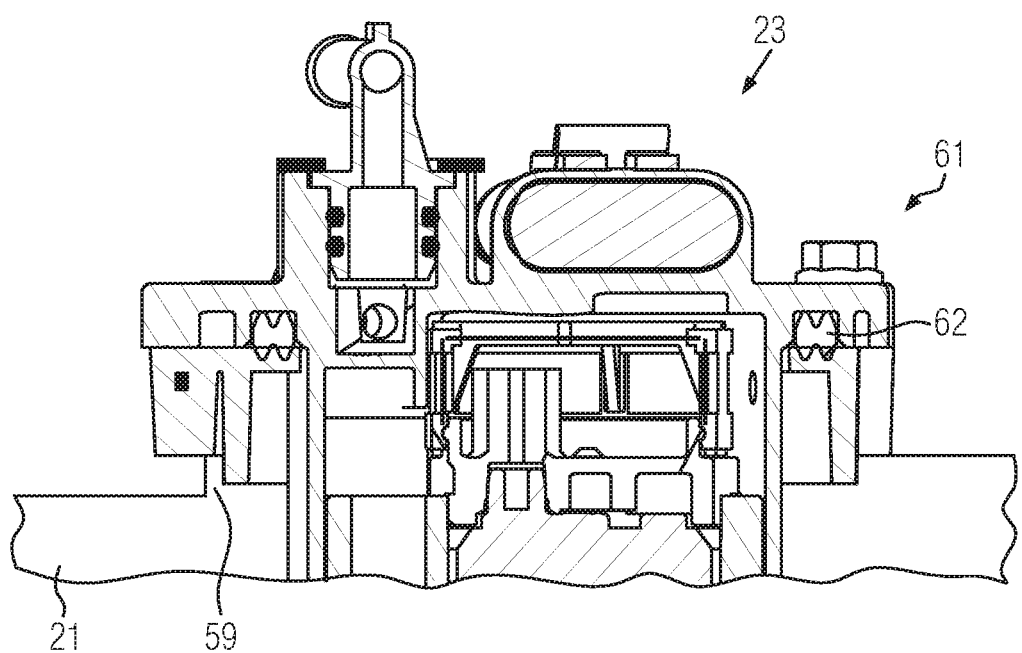
FIG. 14 is a partial sectional view diagramming the arrangement of the fuel pump on the tank body.

The fuel pump 23, as seen in FIG. 6, and its attachment to the underside 21 of tank body 2, can be seen in more detail in FIG. 14. The tank body 2 has a receiving surface 59 in the form of a flange surface 60 on the underside 21, which can be fixed on the underside 21 by means of a welding process. The fuel pump 23 has a housing 61 with a pump flange 62 which can be supported on the flange face 60 and provides a fluid-tight configuration with the interposition of a sealing device 63.

Figure 7:
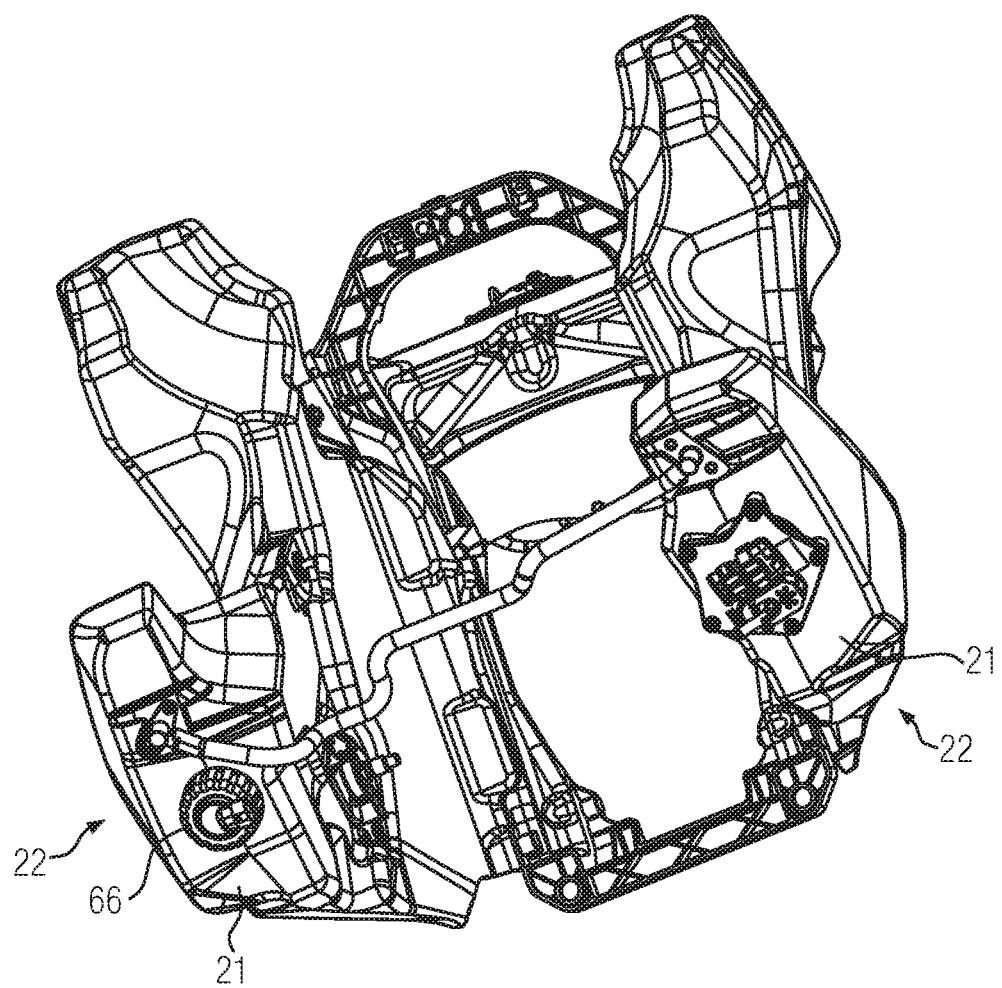
FIG. 7 a representation related to that shown in FIG. 6, but showing the fuel tank arrangement in a view from below.
Figure 15:
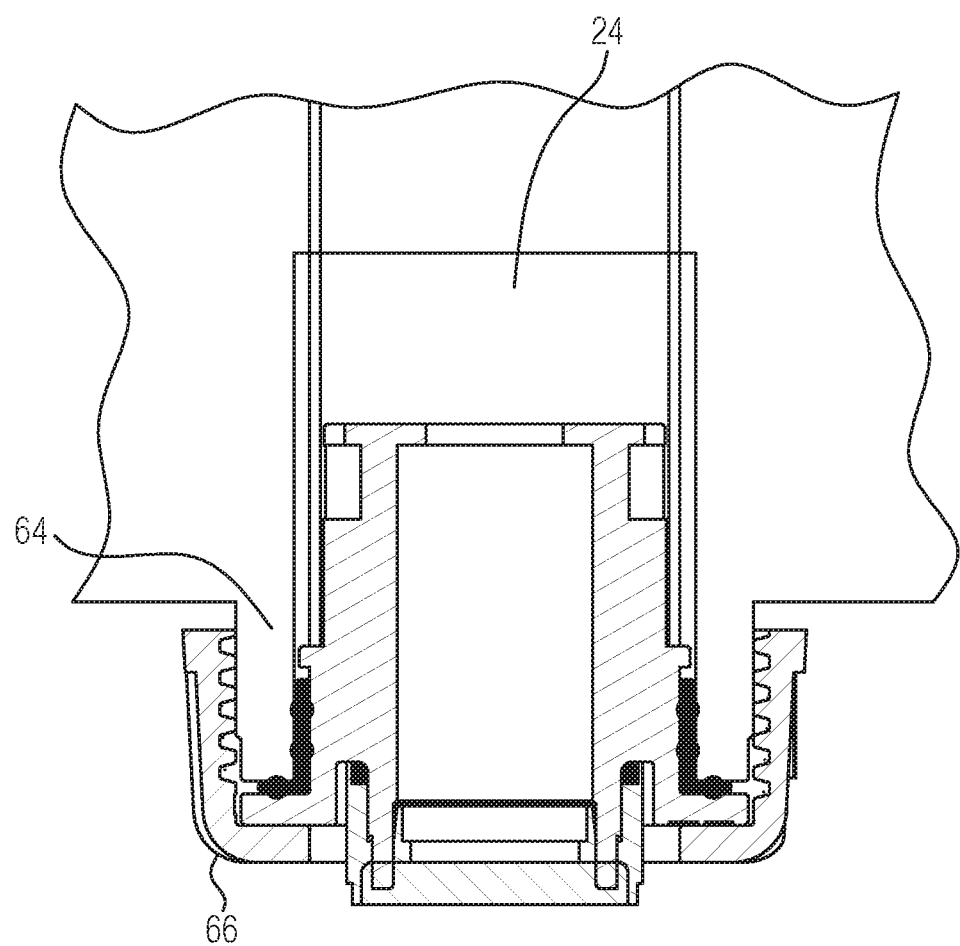
FIG. 15 a partial sectional view diagramming the arrangement of the level measuring device on the tank body.

The arrangement of the filling level measuring device 24 in the tank body 23, as shown in FIG. 6, is carried out (in the design shown) by means of a threaded flange 64 formed on the tank body (seen in FIG. 15), on which the filling level measuring device 24 can be fixed fluid-tight and detachably with the interposition of a sealing device 65 via a union nut 66, also shown in FIG. 7 of the drawing.

Figure 18:
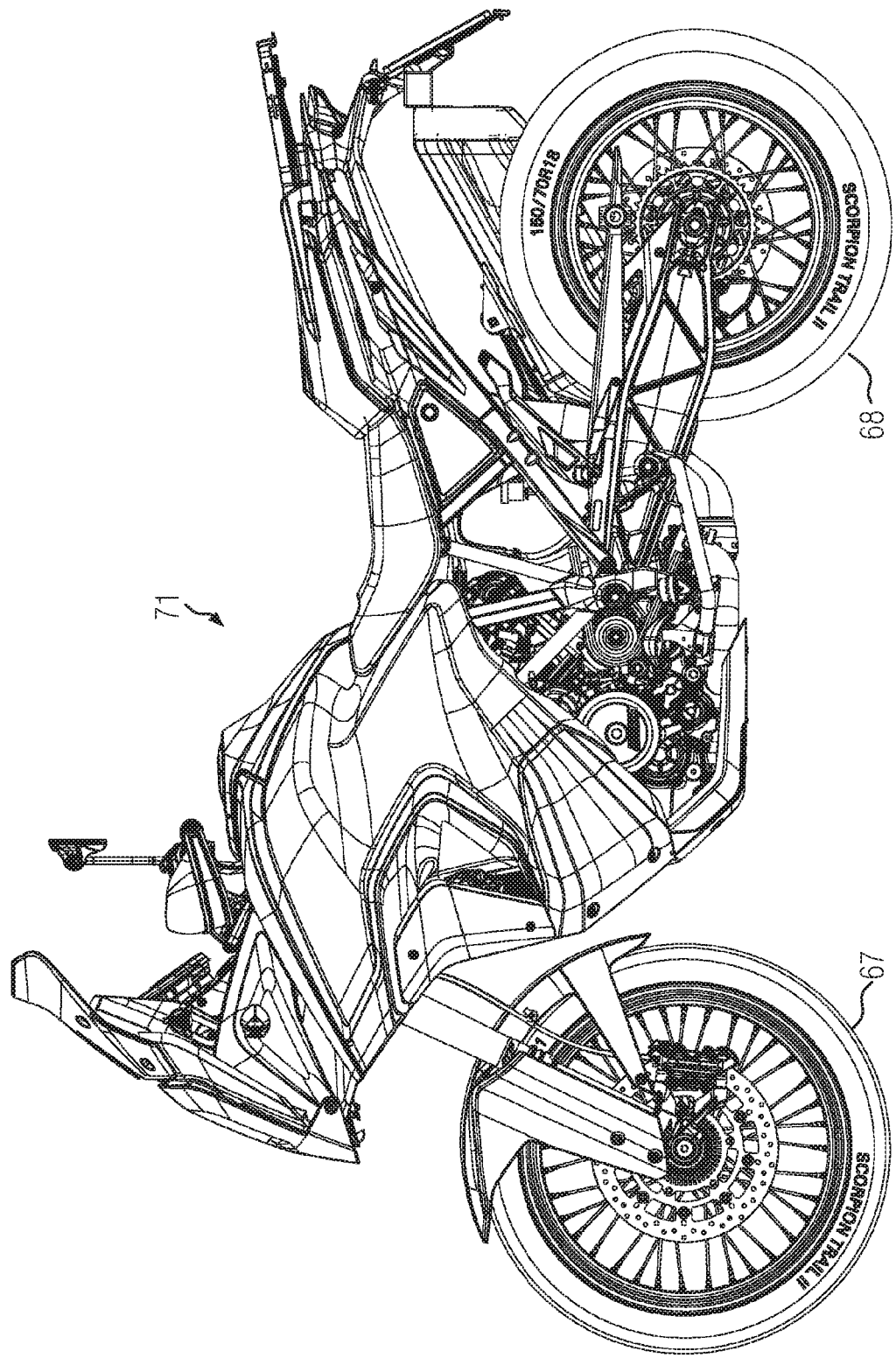
FIG. 18 is a side view similar to that shown in FIG. 17, showing the motorcycle with covers covering the fuel tank arrangement.

Referring to FIG. 17, the fuel tank assembly 1 can be mounted on a motorcycle 54 and detachably fixed to its frame 48. The motorcycle 54, with a front wheel 67 and a rear wheel 68 and a drive motor 69, also has a driver's saddle 70, as shown in FIG. 18, where a user can sit. As further shown in FIG. 18, the fuel tank assembly 1 can be completely covered by fairing components 71, so that it is not necessary to apply paint or topcoat separately to the tank bodies 2, 3 of the fuel tank assembly 1.

The fuel tank arrangement according to the invention is characterized by the fact that separate tank bodies can be pre-assembled on a tank carrier and can be mounted on the vehicle in the pre-assembled state in the form of, for example, a motorcycle. The likewise separate distributor body ensures that the fuel can be filled into the separate tank bodies via only one fuel filler opening, and that an independent, closable fuel filler opening is not necessary for each tank body.

The distributor body is connected to the tank bodies by fluid lines and the fuel tank assembly can be positioned and mounted on the vehicle as a unit or assembly.

The fuel tank assembly, as a complete system, may be subjected to any tests and can be easily disassembled as a complete system for maintenance on the vehicle fitted with it, while maintaining the requirement for a fluid-tight configuration. The tank carrier also has the advantage that it provides connection surfaces for other components such as panels, storage compartments and other components such as the driver's saddle.

LIST OF REFERENCE SIGNS 1. fuel tank arrangement
2. tank body
3. tank body
4. receiving medium
5. carrier module
6. distribution element
7. distributor body
8. connecting element
9. connecting hose
10. fastener means
11. fluororubber hose, hose
12. connection nozzle
13. clamp
14. tank body interior
15. tank body interior
16. fuel filler opening 17. distributor body interior
18. fuel cap
19. top side
20. opening
21. bottom side
22. receiving surface
23. fuel pump
24. level measuring device
25. outlet
26. connection nozzle
27. top side
28. connection
29. first venting device
30. venting hose
31. interior
32. connection range
33. second venting device
34. venting hose
35. hose connector
36. hose connector
37. throttle
38. diameter reduction
39. outlet end
40. fuel level
41. residual space
42. compensating chamber
43. first receiving face
44. second receiving face
45. mounting lug
46. receiving face
47. elastic holding device
48. frame, frame component
49. top side
50. third receiving face
51. handle element
52. handle element
53. transverse side
54. motorcycle
55. main support points
56. mounting face
57. top draft tube
58. connection points
59. receiving face
60. flange face
61. housing
62. pump flange
63. sealing device
64. threaded flange
65. sealing device
66. union nut
67. front wheel
68. rear wheel
69. drive motor
70. driver's saddle
71. fairing components With regard to features of the invention not explained in detail above, explicit reference is made to the patent claims and the drawing views.

What is claimed is:

1. A fuel tank arrangement (1) with at least two separate tank bodies (2, 3), each with a respective tank body interior (14, 15), and at least one connecting element (8) connecting the tank bodies (2, 3) for fluid communication, wherein:
   the tank bodies (2, 3) and the fuel tank arrangement (1) are formed with receiving means (5) for arrangement on a frame component (48) of a vehicle (54) with a driver's saddle (70);
   the fuel tank arrangement (1) has a distributor element (6) with a fuel filling opening (16) and the distributor element (6) is connected to the tank bodies (2, 3) in a fluid-conducting manner by means of at least one fluid-conducting connecting means (11);
   the distributor element (6) configured so that the tank bodies (2, 3) are fillable with fuel by means of only one single fuel filling opening (16) of the distributor element (6); and
   the distributor element (6) has a distributor body (7) comprising a distributor body interior (17), from which body interior the at least one fluid-conducting connecting means (11) to the tank bodies (2, 3) is disposed for filling the tank bodies (2, 3) with fuel.

2. The fuel tank arrangement (1) according to claim 1, further comprising:
   a first fluid-conducting venting device (29) between a respective tank body (2, 3) and the distributor element (6); and
   a second fluid-conducting venting device (33) between a respective tank body (2, 3) and the distributor element (6).

3. The fuel tank arrangement (1) according to claim 2, wherein the respective first venting device (29) and the second (33) venting device extend from the tank body interior (14, 15) of a respective tank body (2, 3) to the distributor body interior (17), and at least one of the venting devices (29, 33) is arranged along at least a portion of the extension from the tank body interior (14, 15) to the distributor body interior (17) within the fluid-conducting connecting means (11).

4. The fuel tank arrangement (1) according to claim 3, wherein the second venting device (33) comprises a throttle (37), in a region of the fluid-conducting connection to the distributor body interior (17), comprising a diameter reduction (38) of the inner diameter of a fluid-conducting connecting line (34) of the second venting device (33).

5. The fuel tank arrangement (1) according to claim 2, wherein the fluid-conducting connecting means (11) is a tubular body which is releasably fixable respectively between the tank body (2, 3) and the distributor body (7), and has an internal diameter which is dimensioned to accommodate a fluid-conducting venting device (29, 30).

6. The fuel tank arrangement (1) according to claim 1, wherein the tank bodies (2, 3) and the distributor element (6) comprise a blow-molded plastic material, and each of the bodies (2, 3) and the distributor element (6) has a connecting piece (12) at mutually assigned connection regions (25), which connecting piece (12) comprises a blow-molded plastic material and is fixed in a form-fitting manner to the respective connection region (25).

7. The fuel tank arrangement (1) according to claim 1, wherein the distributor body (7) has a connecting surface (27) for releasably fixing a receptacle (28) for fixing a tank cap (18) of the vehicle.

8. The fuel tank arrangement (1) according to claim 1, further comprising a receiving means comprising a receiving device (5), the receiving device comprising:
   a first receiving surface (43) for detachably fixing the distributor element (6) to the receiving device (5);
   second receiving surfaces (44) for detachably fixing the tank bodies (2, 3) to the receiving device (5); and
   mounting surfaces (56) for detachably fixing the fuel tank arrangement (1) to the frame component (48) of the vehicle.

9. The fuel tank arrangement (1) according to claim 8, wherein the receiving device (5) comprises:

a plastic material; and in a plan view, a substantially rectangular configuration having fastening lugs (25) extending away from an underside surface for releasably fixing the tank bodies (2, 3).

10. The fuel tank arrangement (1) according to claim 1, wherein at least one of the tank bodies (2, 3) comprises:

a receiving surface (22) on an underside region (21) for the releasable fixing of a fuel pump (23); and a receiving surface (22) on an underside region (21) for the releasable fixing of a level measuring device (24).

11. The fuel tank arrangement (1) according to claim 1, wherein the tank bodies (2, 3) comprise receiving surfaces (46) for supporting the tank bodies (2, 3) on elastic receiving means (47) that are releasably fixable to the frame component (48).

12. The fuel tank arrangement (1) according to claim 1, wherein the at least one connecting element (9) comprises a connecting line detachably fixable to the tank bodies (2, 3) in a region of their respective undersides.

13. The fuel tank arrangement (1) according to claim 1, wherein the distributor element (6) defines a compensation space (42) for receiving fuel.

14. The fuel tank arrangement (1) according to claim 1, wherein the vehicle comprises a motorcycle (54) having a front wheel (67) and a rear wheel (68).

* * * * *